US007158791B2

(12) United States Patent
Karino et al.

(10) Patent No.: US 7,158,791 B2
(45) Date of Patent: Jan. 2, 2007

(54) ROUTE UPDATING METHOD FOR MICROMOBILITY NETWORK

(75) Inventors: Shuichi Karino, Tokyo (JP); Shuji Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 893 days.

(21) Appl. No.: 09/909,813

(22) Filed: Jul. 23, 2001

(65) Prior Publication Data
US 2002/0025817 A1    Feb. 28, 2002

(30) Foreign Application Priority Data
Aug. 25, 2000    (JP)    ............................. 2000-255872

(51) Int. Cl.
*H04Q 7/20*    (2006.01)
(52) U.S. Cl. ...................... 455/449; 370/217; 370/219; 709/238
(58) Field of Classification Search ................ 455/445, 455/436, 444, 449; 370/328, 329, 331, 465
See application file for complete search history.

(56) References Cited

U.S. PATENT DOCUMENTS

| 6,421,731 | B1 * | 7/2002 | Ciotti et al. ................. 709/238 |
| 6,490,259 | B1 * | 12/2002 | Agrawal et al. ............. 370/331 |
| 6,654,359 | B1 * | 11/2003 | La Porta et al. ............ 370/328 |
| 7,006,431 | B1 * | 2/2006 | Kanekar et al. ............ 370/217 |
| 2001/0044305 | A1 * | 11/2001 | Reddy et al. ................ 455/436 |
| 2004/0213167 | A1 * | 10/2004 | Garcia-Luna-Aceves et al. ........................... 370/254 |

OTHER PUBLICATIONS

Ramjee et al., HAWAII: A Domain-based Approach for Supporting Mobility in Wide-Area Wireless Networks, pp. 283-287.*

European Search Report dated Aug. 26, 2003.
R. Ramjee, et al., "HAWAII: A Domain-based Approach for Supporting Mobility in Wide-area Wireless Networks", Proc. IEEE International Conference Network Protocols, Oct. 31, 1999, pp. 283-292.
Andras G. Valko, "Cellular IP: A New Approach to Internet Host Mobility", ALM. "On-Line", XP-002250272, Aug. 1, 2003.
Ramon Caceres, et al., "Fast and scalable wireless handoffs in support of mobile Internet audio", Mobile Networks and Applications, Baltzer Science Publishers, Bussun, NC, vol. 3, No. 4, 1998, pp. 351-363, XP-002135845.

* cited by examiner

*Primary Examiner*—Temica Beamer
*Assistant Examiner*—Joy Contee
(74) *Attorney, Agent, or Firm*—McGinn IP Law Group, PLLC (57) ABSTRACT

The invention provides a route updating method which reduces the flow rate of updating notifications, which are circulated in a network, to improve the scalability. A micromobility network includes routers connected in a tree connection and radio base stations connected to the routers in the lowest layer such that an updating notification of a route from a mobile terminal is repeated in order from a radio base station to successive higher order routers to update the route and a packet is distributed along the updated route. In the mobility network, directly lower order routers to each router are numbered to the numbers 1 to n with reference to the direct lower order router accommodation number n, and a route from the radio base station to the router in the highest layer represented by a route number composed of the numbers of the thus numbered routers is applied to the radio base station. Upon updating notification, the route number is referred to to determine a stage number m of a transmission range and the updating notification is transmitted to a higher order router corresponding to the stage number m.

25 Claims, 5 Drawing Sheets

FIG. 1

PRIOR ART

ROUTE UPDATING METHOD FOR MICROMOBILITY NETWORK

BACKGROUND OF THE INVENTION

1. Field of the Invention

The present invention relates to a micromobility network wherein routers are connected in a tree connection and radio base stations are connected to the routers. in the lowest layer such that an updating notification of a route from a mobile terminal is repeated in order from a radio base station to successive higher order routers to update the route and a packet is distributed along the updated route, and more particularly to a route updating method for the micromobility network.

2. Description of the Related Art

A conventional mobile support network which is an object of improvement of the present invention is defined in a draft of standards of the Cellular IP (A. G. Valko, "Cellular IP-A New Approach to Internet Host Mobility", *ACM Computer Communication Review*, January 1999) or the like.

Figure 1:
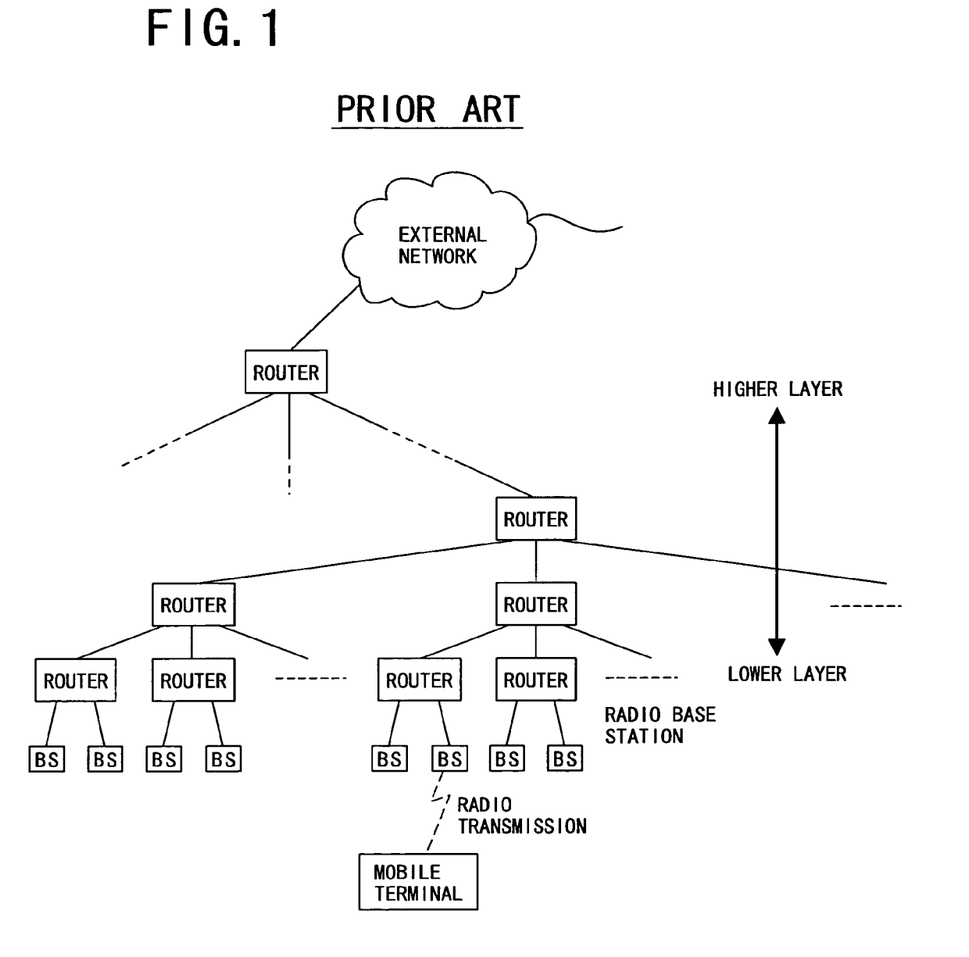
FIG. 1 is a block diagram of a conventional mobile support network.

A mobile support network to which the technique described is applied shown in FIG. 1. Referring to FIG. 1, in the mobile support network shown, fixed nodes are connected in a tree connection by transmission devices not shown. Radio base stations are connected to those of the nodes which are on the bottom side of the tree and communicate with mobile stations by radio transmission.

The root node of the tree is connected to an external network. All packets of mobile terminals to be interchanged with the external network are distributed through the root node. While a mobile terminal remains connected to a radio base station of the mobile support network, to whichever radio base station the mobile terminal is connected, the transportability from the external network is assured with the same address.

A route to a mobile terminal is held separately by separate routers. Each time a mobile terminal moves, it transmits a route updating notification. The route updating notification is successively repeated from the ratio base station of the lowest layer to which the mobile terminal is connected to the router of the highest layer through the intervening routers, and such movement of the mobile terminal is coped with by updating the route on the routers through which the updating notification passes.

Further, in order to raise the failure resisting property or the expandability of the network, route information is realized by the soft state. In particular, if a time determined in advance elapses after a route is produced, then the route disappears automatically. The mobile terminal subjectively holds its route. In particular, even when the mobile station stays at one place, the mobile terminal intermittently transmits a route updating notification in order to hold the route.

Distribution of a packet from the external network to a mobile terminal is performed in the following manner by a router. If a packet arrives at a router from a higher order network interface, then a route information search section searches for route information from the destination of the packet to determine an output destination network interface for the packet and signals the packet from the determined interface. If a transfer destination cannot be determined even if the route information is searched from the destination of the packet, then the packet is abandoned.

This procedure is repeated by each router, and the packet passes a radio base station from a router of the lowermost layer and arrives at the mobile terminal.

A packet transmitted from a mobile terminal is processed in the following manner by a router. When the packet from a lower order network interface arrives, the route information search section searches for route information from a transmission source of the packet. As a result, if route information corresponding to the transmission source of the packet is found, then the route information is updated in accordance with a method described below and the packet is signaled from the higher order network interface. If the search for route information from the transmission source of the packet results in failure, then the packet is abandoned.

If the packet arriving from the lower order network interface is a route updating notification packet, then the route is updated in accordance with information included in the updating notification. On the other hand, if the packet is any other packet, then the disappearance time of the route information corresponding to the origination source of the packet is extended.

The procedure described above is repeated until the packet transmitted from the mobile terminal arrives at the highest layer of the network. When the packet is a route updating notification, it is abandoned in the highest layer of the network. If the packet is any other packet, then it is distributed to the external network. Updating of the route when the mobile terminal moves is performed in the following manner.

From the radio base station, a beacon signal for notification of position information, the identification number of the base station and so forth is transmitted intermittently. The mobile terminal receives the beacon signal from the radio base station and detects its movement when the radio base station connected thereto changes.

If the radio base station connected to the mobile terminal changes, then the mobile terminal transmits a packet of a route updating notification every time. The route updating notification is distributed in accordance with the method described above, and the route to the mobile terminal is updated or produced.

The route information in each router disappears automatically when a time designated in advance elapses after the route information is updated. While the mobile terminal continues to transmit data, the route information is successively updated as a result of passage of the data. If such data is not transmitted, then the mobile station transmits a route updating notification at intervals shorter than the disappearance time to assure the transportability to the terminal from the outside.

In such a network as described above, however, since a router of a higher layer manages routes of a greater number of terminals, updating notifications from a greater number of terminals arrive thereat. Therefore, the total number of updating notifications from all terminals per unit time is greater with a router of a higher layer, and accordingly, in a higher layer, updating notifications occupy a greater part of the bandwidth of the network and, on the router, a greater number of resources are spent for processing of the updating notifications.

SUMMARY OF THE INVENTION

It is an object of the present invention to provide a route updating method which reduces, in a mobile support system of packet communication wherein a route to a mobile terminal is managed as the soft state and route information is updated with a route information updating notification (hereinafter referred to as updating notification) from a mobile terminal to assure the transportability to the mobile terminal, the flow rate of updating notifications, which are circulated in a network, to improve the scalability.

In order to attain the object described above, according to the present invention, a reaching range is introduced into an updating notification such that an updating notification which is to reach a higher layer of a network is circulated in a lower frequency than another updating notification which is to reach only a lower layer of the network. Further, the disappearance time of a route in a router positioned in a higher layer of the network is set to a longer time than that in another router positioned in a lower layer of the network. Consequently, updating of a route is performed in a lower frequency with the router positioned in the higher layer of the network than with the router positioned in the lower layer of the network.

In particular, according to the present invention, there is provided a route updating method for a micromobility network wherein routers are connected in a tree connection and radio base stations are connected to the routers in the lowest layer, and an updating notification of a route from a mobile terminal is repeated in order from a radio base station to successive higher order routers to update the route and a packet is distributed along the updated route, wherein a reaching range of an updating notification from the radio base station toward the higher order routers is set so that the reaching frequency of the updating notification is lower with a higher order router.

More particularly, directly lower order routers to each router are numbered to the numbers 1 to n with reference to the direct lower order router accommodation number n and a route from the radio base station to the router in the highest layer represented by a route number composed of the numbers of the thus numbered routers is applied to the radio base station, and upon updating notification, the route number is referred to to determine a stage number m of a transmission range and the updating notification is transmitted to a higher order router corresponding to the stage number m.

Alternatively, when the mobile terminal stays in the radio base station, where the stage number of higher order routers from the radio base station necessary to hold the route for the mobile terminal is represented by m and the direct lower order router accommodation number of each of the routers is represented by n, the transmission range of a packet is set to the router in the higher order m+1th stage from the radio base station once per $n^m$ times.

In either case, a notification of the route number applied to the radio base station may be issued from the radio base station to the mobile terminal, and the mobile terminal may determine the stage number m of the transmission range and transmits the stage number m together with the updating notification. Or, the radio base station which receives the updating notification from the mobile terminal may determine the stage number m of the transmission range. Further, a route holding time of each of the routers may be n times that of the routers which are in the directly lower order to the router.

With the route updating method, a route updating notification reaches a router of a higher layer of a network less frequently. Since a router positioned in a higher layer of the network holds a route for a longer period of time, even if an updating notification reaches the router less frequently, a route to a mobile terminal continues to be held. While a router positioned in a higher layer of the network need hold routes of a greater number of moving hosts, since the reaching frequency of an updating notification of each moving host is lower with a router of a higher layer of the network, the scalability with regard to the number of moving hosts which can be accommodated in the network is improved.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 2:
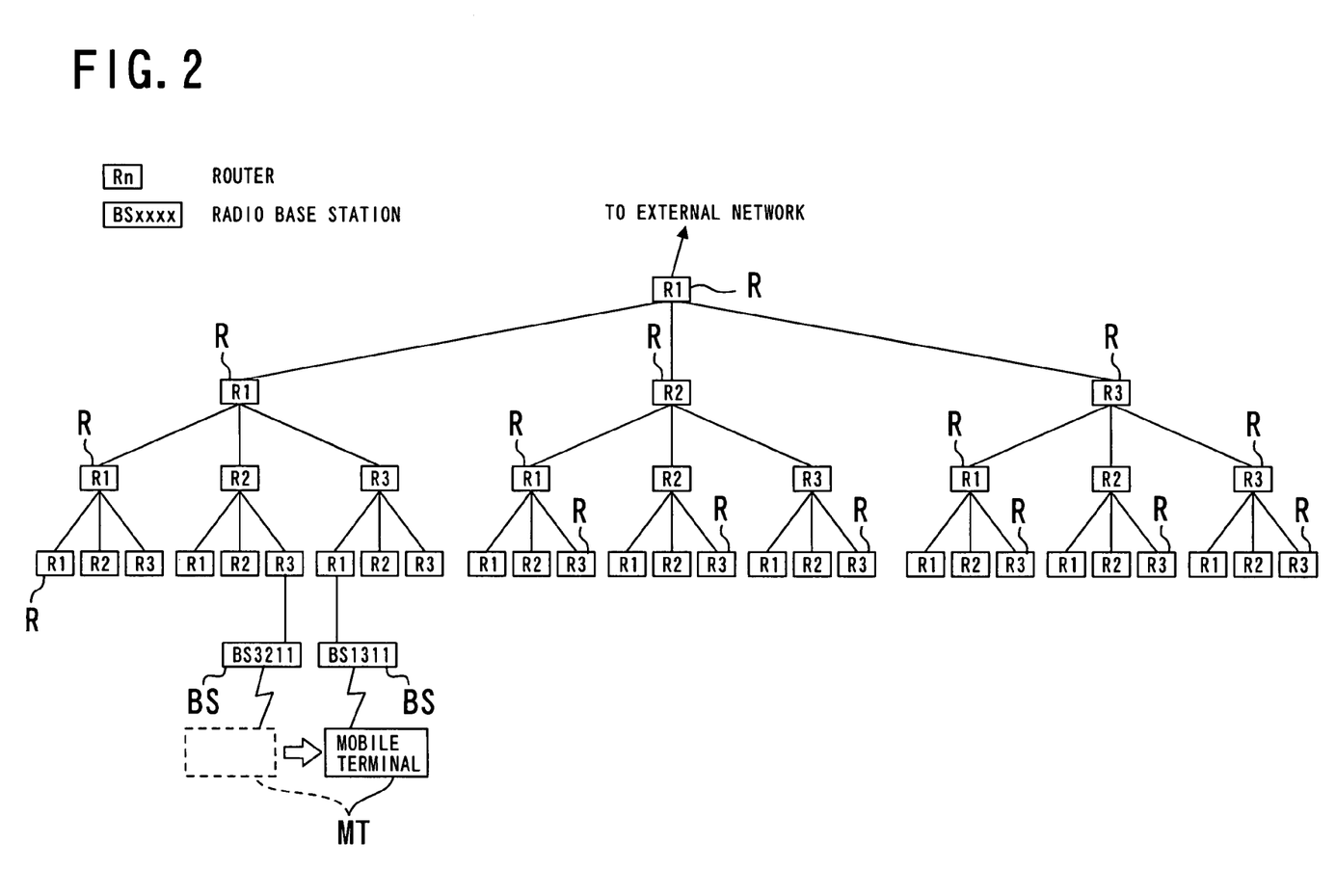
FIG. 2 is a block diagram of a micromobility network to which a route updating method according to the present invention is applied.

Referring to FIG. 2, there is shown a micromobility network to which a route updating method according to the present invention is applied. In the network shown, routers R are connected in a tree connection, and an external network is connected to one of the routers which is in the highest layer of the network while a radio base station BS is connected to each of the routers R of the lowest layer. The routers R and the radio base stations BS are connected to each other by transmission devices not shown. A mobile terminal MT transmits and receives data through a radio base station BS. The mobile terminal MT and the radio base station are connected to each other by a transmission device not shown.

Where the directly lower order router accommodation number (lower order network interface number) of each router is represented by n, the n directly lower order routers are numbered to the numbers 1 to n. For example, if it is assumed that the directly lower order router accommodation number n is equal among all routers and n=3, then as seen from FIG. 2, the router in the highest layer is numbered as 1 (in FIG. 2, represented as R1); the three routers in the second layer directly below the router of the first layer are numbered as 1, 2, 3 (in FIG. 2, represented as R1, R2, R3, respectively); the three routers in the third layer directly below the first (R1) router are numbered as 1, 2, 3 (represented as R1, R2, R3 similarly); also the three routers in the third layer directly below the second (R2) router are numbered as 1, 2, 3 (represented as R1, R2, R3 similarly); also the three routers in the third layer directly below the third (R3) router are numbered as 1, 2, 3 (represented as R1, R2, R3 similarly); and also the other routers are numbered in a similar manner.

To each radio base station BS, a route from the radio base station to the router of the highest layer is applied in advance with the numbers of the routers numbered in such a manner as described above in addition to an identification number unique to the radio base station BS. For example, in the case of only two radio base stations shown in FIG. 2, a route number of "3211" wherein the number of the router in the lowest layer is the most significant digit and the number of the router in the highest layer is the least significant digit is applied to the left side radio base station (in FIG. 2, the route number is denoted as BS3211) while another route number of "1311" is applied similarly to the right side radio base station (in FIG. 2, the route number is denoted as BS1311).

Accordingly, the mth digit from the most significant digit of a route number applied in this manner is the number applied to the router higher by m stages as counted from the radio base station. When the radio base station connected to a mobile terminal changes over, if the value of the mth digit changes, then this represents that the router in the mth stage changes.

Here, if the router in the mth stage from below (from the radio base station) changes over but the router or routers in the higher stage or stages do not change over, then a route updating notification must be sent to the m+1th stage. This is because the router in the m+1th stage must change over the interface to be used for outputting.

Figure 3:
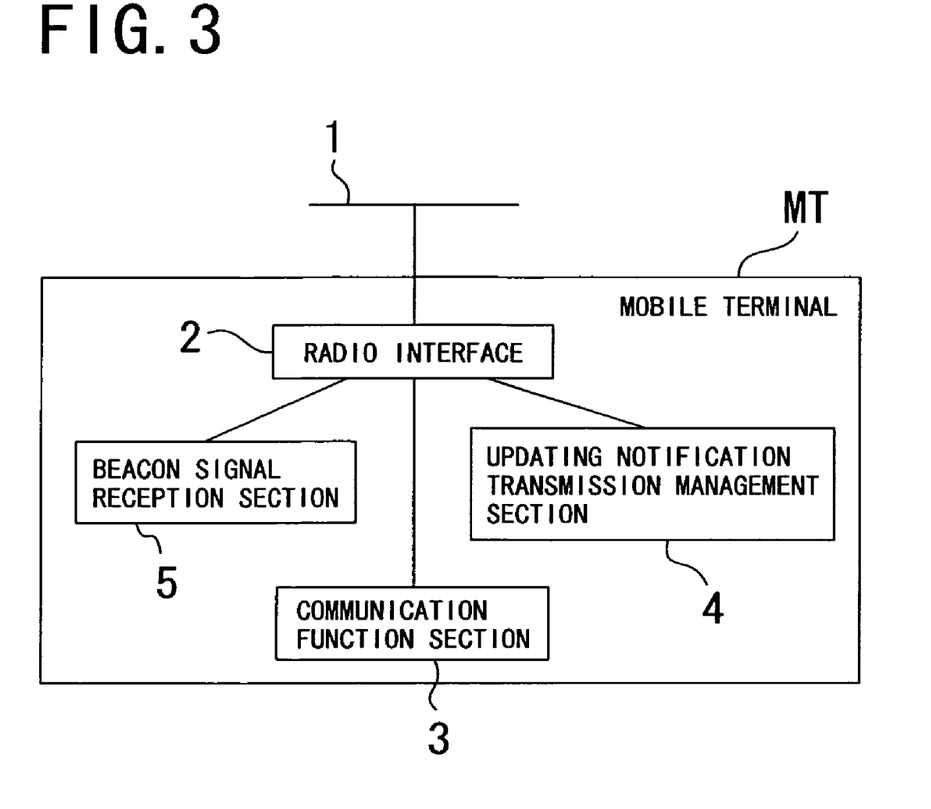
FIG. 3 is a block diagram showing a functional configuration of a mobile terminal shown in FIG. 2.

The mobile terminal MT has such a configuration as shown in FIG. 3. Referring to FIG. 3, an antenna 1 is used for communication with a radio base station BS. The antenna 1 is connected to a radio interface 2 so that all packets which are transmitted and received through the antenna 1 pass through the radio interface 2. A communication function section 3 performs preparation, transmission and reception, and interpretation of communication data. Any function as viewed from the user of the mobile terminal MT is implemented by the communication function section 3. An updating notification transmission management section 4 performs transmission management of an updating notification. A beacon signal reception section 5 performs interpretation of a beacon signal which is transmitted intermittently from each radio base station BS. The mobile terminal MT discriminates the identification number of the radio base station BS connected thereto at present and the route number from the beacon signal from the radio base station BS.

Further, the updating notification transmission management section 4 supervises transmission of data and performs a process of transmitting an updating notification if data is not transmitted for a fixed time. Further, the updating notification transmission management section 4 supervises the radio base station identification number obtained from the beacon signal and performs a process of transmitting an updating notification if it receives a beacon signal which includes the number of a different radio base station. A transmission range calculation section (not shown) included in the updating notification transmission management section 4 calculates a range of transmission of an updating notification based on the route number from the radio base station BS.

Figure 4:
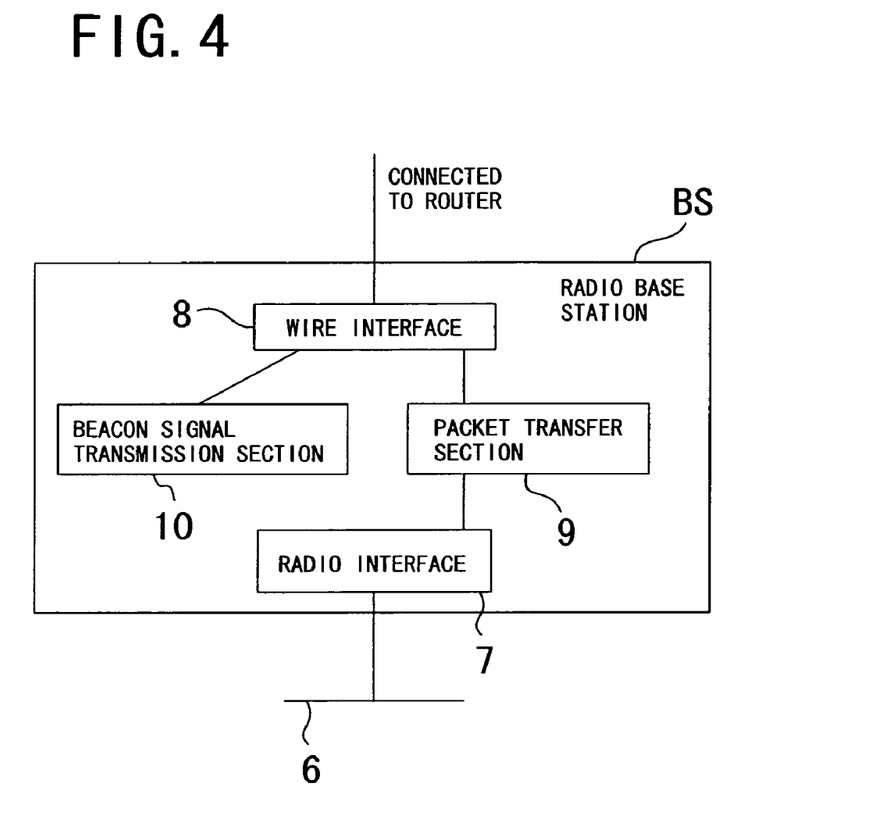
FIG. 4 is a block diagram showing a functional configuration of a radio base station shown in FIG. 2.

The radio base station BS has such a configuration as shown in FIG. 4. Referring to FIG. 4, an antenna 6 is used for transmission/reception to/from a mobile terminal MT. Upon transmission/reception of a packet in which the antenna 6 is used, data passes through a radio interface 7. Connection to a router R is performed through a wire interface 8. A packet transfer section 9 performs a process of signaling data arriving at one of the interfaces 7 and 8 to the other interface 8 or 7. A beacon signal transmission section 10 performs a process of intermittently preparing a beacon signal packet and signaling the beacon signal packet from the radio interface 7. At this time, the radio base station BS includes the above-described route number applied to the radio base station into the beacon signal.

Figure 5:
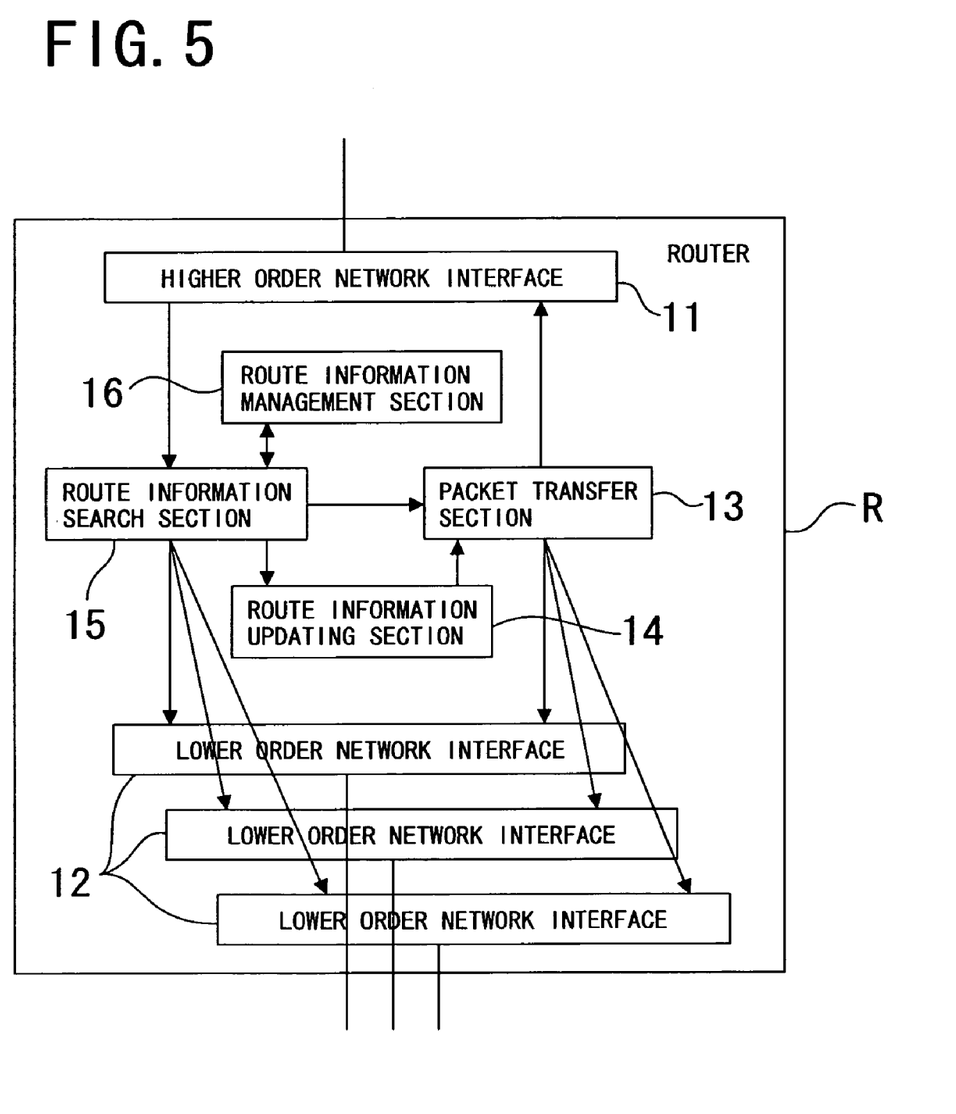
FIG. 5 is a block diagram showing a functional configuration of a router shown in FIG. 2.

Each router R has such a configuration as shown in FIG. 5. Referring to FIG. 5, a higher order network interface 11 is used for connection to another router R on the farther side from the radio base station BS. n lower order network interfaces 12 are used for connection to the routers R on the nearer side to the radio base station BS. A packet transfer section 13 signals a packet to a designated one of the interfaces 11 and 12. A route information updating section 14 updates or prepares route information with designated contents. A route information search section 15 searches for route information in accordance with a designated method.

A route information management section 16 stores route information and deletes any entry with regard to which a predetermined time elapses after it is updated. The disappearance time is set longer with a router positioned in a higher layer in the network. For example, the disappearance time is set in accordance with the number of routers which are positioned immediately below the router. In particular, where the number of lower order network interfaces is n, the route holding time of the router is set to n times that of the routers immediately below the router.

Now, operation of the system having the configuration described above is described.

Each mobile terminal MT calculates, by the transmission range calculation section thereof, the transmission range of an updating notification in the following manner based on the route number included in the beacon signal from a radio base station BS, and signals the updating notification including information of the transmission range.

In particular, when the mobile terminal MT moves to another radio base station, it successively checks the digits of the route numbers applied to the new and old radio base stations to search for the lowest digit at which the value is different between the route numbers, and determines the searched out digit as the transmission range of the updating notification.

For example, if the mobile terminal MT moves from the radio base station (BS3211) to which the route number of "3211" is applied to the radio base station (BS1311) to which the route number of "1311" is applied in FIG. 2, then since "3211" and "1311" are different in value in the digits down to the second digit from the most significant digit, the transmission range of the updating notification is determined as the third stage because the stage number must be m+1 as described above. Accordingly, in this instance, the updating notification is sent up to the router in the third stage from blow, but is not sent to a router in any higher stage.

If the values of all of the digits coincide with each other and it is determined that the radio base station has changed over, then this signifies that the changeover has occurred between two radio base stations which are connected to the same router. If the mth digit is the lowest order digit and the values of the mth digit are different from each other, then the stages up to the m+1th stage must be the transmission range of the updating notification. If all of the digits are equal, then m=0.

On the other hand, if the mobile terminal MT stays, then an updating notification is successively transmitted in order to hold an existing route. In this instance, in order to make the transmission frequency of updating notifications which reach a higher layer lower than the transmission frequency of updating notifications which reach only a low layer, the transmission range calculation section of the mobile terminal MT changes the transmission range of an updating notification in the following manner.

When the mobile terminal MT stays in one radio base station BS, where the number of stages of higher routers from the radio base station necessary to hold the route of the mobile terminal MT is represented by m and the directly lower order router accommodation number of the router R is n, the transmission range of a packet is set to a router of the m+1th stage higher than the radio base station BS once by $n^m$ times. If a case wherein n is 3 and m is 2 is taken as an example, then the transmission range of an updating notification is varied in a period of once per 9 times in the following manner.

1, 1, 2, 1, 1, 2, 1, 1, 3, 1, 1, 2, 1, 1, 2, 1, 1, 3, . . .

Each router R decrements, upon transfer processing of an updating notification, the transmission range by 1, and if the resulting value is 0, then the router abandons the packet without transferring it.

In the example described above, the number of updating notifications which are circulated in order to hold a route in the mth network from below is 1/n per terminal when compared with that in the m−1th network from below. On the other hand, since the number of routers accommodated is n, the number of terminals to be managed increases to n times in average in a stage higher by one stage. Accordingly, the number of updating notifications which flow in the network is statistically equal between the mth stage and the m−1th stage, and the scalability is obtained without depending upon the performances of the routers.

While, in the embodiment described above, calculation of a transmission range is performed by each mobile terminal MT, since the mobile terminal MT may possibly have an operation power or processing capacity insufficient to perform fine control with regard to the transmission range of an updating notification, the calculation may be performed not by the mobile terminal MT but by each radio base station BS. In the following, operation in this instance is described.

The mobile terminal MT transmits an updating notification without setting a transmission range. At this time, the identification number of the radio base station BS to which the mobile terminal MT has been connected formerly is included in the updating notification. Further, the interval of an updating notification to be transmitted in order to hold the route is set with reference to a disappearance time of a route held by the routers R of the lowest layer.

The radio base station BS has a route updating information holding section and holds a route information disappearance hour of the router R in the higher layer to the radio base station BS for each mobile terminal MT in the route updating information holding section. If a route updating notification from a mobile terminal MT arrives at the radio base station BS, then the radio base station BS determines a reaching range of the updating notification in a similar manner as in the procedure described hereinabove in the description of the embodiment and signals information of the reaching range together with the updating notification. Assuming that the updating notification is received immediately after it is signaled, the route information holding section in the radio base station BS updates the factor of the mobile terminal.

According to this operation, the mobile terminal MT must only transmit an updating notification without being conscious of the transmission range, and the necessity for management of the disappearance time of a route in the router R of the higher layer or the range of movement is eliminated.

While a preferred embodiment of the present invention has been described using specific terms, such description is for illustrative purposes only, and it is to be understood that changes and variations may be made without departing from the spirit or scope of the following claims.

What is claimed is:

1. A route updating method for a micromobility network wherein routers are connected in a tree connection and radio base stations are connected to the routers in a lowest layer, said method comprising:
   repeating an updating notification of a route from a mobile terminal, in order, from a radio base station to successive higher order routers, to update the route, a packet being distributed along the updated route,
   wherein a reaching range of an updating notification from the radio base station toward the higher order routers is set so that the reaching frequency of the updating notification is lower with a higher order router.

2. A route updating method for a micromobility network as claimed in claim 1, wherein directly lower order routers to each router are numbered to the numbers 1 to n with reference to the direct lower order router accommodation number n, and a route from the radio base station to the router in the highest layer represented by a route number, including the numbers of the thus numbered routers, is applied to the radio base station, and
   upon updating notification, the route number is referred to in order to determine a stage number m of a transmission range and the updating notification is transmitted to a higher order router corresponding to the stage number m.

3. A route updating method for a micromobility network as claimed in claim 1, wherein, when the mobile terminal stays in the radio base station, where a stage number of higher order routers from the radio base station necessary to hold the route for the mobile terminal is represented by m and a direct lower order router accommodation number of each of the routers is represented by n, the transmission range of a packet is set to the router in a higher order m+1th stage from the radio base station once per $n^m$ times.

4. A route updating method for a micromobility network as claimed in claim 2, wherein a notification of the route number applied to the radio base station is issued from the radio base station to the mobile terminal, and the mobile terminal determines the stage number m of the transmission range and transmits the stage number m, together with the updating notification.

5. A route updating method for a micromobility network as claimed in claim 3, wherein a notification of the route number applied to the radio base station is issued from the radio base station to the mobile terminal, and the mobile terminal determines the stage number m of the transmission range and transmits the stage number m, together with the updating notification.

6. A route updating method for a micromobility network as claimed in claim 2, wherein the radio base station which receives the updating notification from the mobile terminal determines the stage number m of the transmission range.

7. A route updating method for a micromobility network as claimed in claim 3, wherein the radio base station which receives the updating notification from the mobile terminal determines the stage number m of the transmission range.

8. A route updating method for a micromobility network as claimed in claim 2, wherein a route holding time of each of said routers is n times that of the routers which are in the directly lower order to the router.

9. A route updating method for a micromobility network as claimed in claim 3, wherein a route holding time of each of said routers is n times that of the routers which are in the directly lower order to the router.

10. The method of claim 1, wherein said packet includes an indication of said reaching range.

11. The method of claim 10, further comprising:
determining, by a router receiving said packet, whether to forward said packet to a next higher level router in said tree configuration.

12. The method of claim 1, wherein, when a mobile terminal changes from one radio base station to a new radio base station, said reaching range comprises a first layer having no change in a routing to said new radio base station.

13. A route updating method for a micromobility network, wherein routers are connected in a tree configuration having a plurality of layers and extending up in layers to a root router connected to an external network and radio base stations are connected to the routers in a lowest layer of said tree configuration, said route updating method comprising:
receiving, in a router in a layer of said tree, a routing updating notification packet from a next lower layer and updating said routing in said router, said packet including an update reaching range defining a highest level in said tree connection to which said updating notification is to be transmitted.

14. The method of claim 13, further comprising:
determining, in said router, whether said update reaching range requires that said routing updating notification packet be forwarded to a router in a next higher layer.

15. A communication network, comprising:
a plurality of routers interconnected in a tree structure having a plurality of layers in an order, each said layer having at least one router; and
at least one radio base station connected to each router in a lowest order layer of said tree structure,
wherein an updating notification of a route from a mobile terminal is repeated in order from a radio base station to successive higher order routers to update the route, a packet being distributed along the updated route for said route update, said packet including an update reaching range that defines a highest level in said tree connection to which said updating notification is to be transmitted.

16. The communication network of claim 15, wherein each said router receiving said route update packet determines whether to forward said received packet to a next higher order router by determining whether said router receiving said packet is the last level in said update reaching range.

17. The communication network of claim 16, wherein, when a mobile terminal changes from one radio base station to a new radio base station, said reaching range comprises a first layer having substantially no change in routing updating notification.

18. A router for a communication network interconnected in a tree structure having a plurality of ordered layers extending up in layers to a root router connected to an external network, said router comprising:
a lower order network interface for receiving a route updating notification packet from a router of a lower order of said tree structure, said packet including an update reaching range that defines a highest level in said tree connection to which said updating notification is to be transmitted; and
a route information updating section to update a routing information in said router, based on said received packet, and to determine whether said update reaching range requires that said received packet be forwarded to a next higher order router.

19. A radio base station for a communication network comprising a plurality of routers interconnected in a tree structure having a plurality of layers in an ordering, said radio base station comprising:
a wire interface to connect to a lowest order router in said tree structure;
a radio interface to communicate with a mobile terminal using said communication network; and
a beacon signal transmission section to prepare a route number that identifies a location of said radio base station in relation to said tree structure, said location being identified by a string of numbers, said numbers in said string identifying a router location in respective layers of said tree structure, an order of said numbers in said string being in accordance with an ordering of said layers in said tree structure.

20. The radio base station of claim 19, further comprising:
a calculator to compute an update reaching range of a routing update notification for said mobile terminal, said update reaching range defining a number of said ordered layers of said tree structure that are to receive said routing update notification.

21. A mobile terminal for a communication network comprising a plurality of routers interconnected in a tree structure having a plurality of layers in an ordering, said mobile terminal comprising:
a radio interface to communicate with a radio base station in said communication network, said radio base station associated with a lower order router in said tree structure; and
a calculator to compute an update reaching range of a routing update notification for said mobile terminal, said update reaching range defining a number of said ordered layers of said tree structure that are to receive said routing update notification.

22. The mobile terminal of claim 21, wherein a location of said radio base station in relation to said tree structure is identified by a string of numbers, each said number in said string identifying a router location in a layer of said tree structure, an order of said numbers in said string being in accordance with an ordering of said layers in said tree structure.

23. The mobile terminal of claim 22, wherein, when a mobile terminal changes from one radio base station to a new radio base station, said reaching range comprises a first layer having substantially no change in routing updating notification.

24. A communication network, comprising:
a plurality of routers interconnected in a tree structure having a plurality of layers in an order, each said layer having at least one router; and
at least one radio base station connected to each router in a lowest order layer of said tree structure, to communicate with mobile terminals,
each said radio base station providing a routing notification of mobile terminals communicating therewith, by periodically repeating an updating notification of a route for said mobile terminals to routers in said tree structure connecting said radio base station to a root node of said tree structure,
wherein an updating notification period of a router in successively higher order layers is set successively longer, thereby allowing an updating notification frequency of said successively higher order layers to be set successively lower.

25. A route updating method for a micromobility network wherein routers are connected in a tree connection and radio base stations are connected to the routers in the lowest layer, and an updating notification of a route from a mobile terminal is repeated in order from a radio base station to successive higher order routers to update the route along which a packet is to be distributed and then a packet is distributed along the updated route, said micromobility network being of the soft state wherein, after an interval of time determined in advance elapses, the route updated is automatically cancelled, said method comprising:

numbering directly lower order routers to each router to the numbers 1 to n with reference to the direct lower order router accommodation number n;

applying a route from the radio base station to the router in the highest layer represented by a route number composed of the numbers of the thus numbered routers to the radio base station; and referring, upon updating notification, to the route number to determine a stage number m of a transmission range to higher order routers and the updating notification is transmitted to a higher order router corresponding to the stage number m so that a reaching range of the updating notification is set so that the reaching frequency of the updating notification is lower with a higher order router.

* * * * *